US007137676B2

(12) United States Patent
Sugimoto et al.

(10) Patent No.: US 7,137,676 B2
(45) Date of Patent: Nov. 21, 2006

(54) ELECTRONIC APPLIANCE

(75) Inventors: Kiyofumi Sugimoto, Kawagoe (JP); Masato Nakamura, Kawagoe (JP); Katsuomi Saito, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 10/272,006

(22) Filed: Oct. 17, 2002

(65) Prior Publication Data
US 2003/0085325 A1 May 8, 2003

(30) Foreign Application Priority Data
Nov. 8, 2001 (JP) ............................. 2001-342931

(51) Int. Cl.
*A47B 5/00* (2006.01)
(52) U.S. Cl. ................ 312/7.2; 312/223.1; 312/223.2; 348/836
(58) Field of Classification Search ............ 312/223.1, 312/223.2, 319.1, 319.2, 322, 323, 325, 8.12, 312/8.15, 8.14, 9.1, 9.11, 9.16, 9.55, 9.56, 312/309, 7.2, 204; 348/837, 836, 838, 740, 348/827
See application file for complete search history.

(56) References Cited

U.S. PATENT DOCUMENTS

| 4,718,740 | A | * | 1/1988 | Cox ........................ 312/223.2 |
| 4,760,502 | A | * | 7/1988 | Ackeret ........................ 362/86 |
| 5,276,589 | A | * | 1/1994 | Bartlett et al. .............. 361/681 |
| 5,494,447 | A | * | 2/1996 | Zaidan ......................... 439/31 |
| 5,924,782 | A | * | 7/1999 | Park ........................... 312/328 |
| 5,941,615 | A | * | 8/1999 | Ito et al. ...................... 312/7.2 |
| 6,529,382 | B1 | * | 3/2003 | Terao ......................... 361/726 |
| 6,557,385 | B1 | * | 5/2003 | Shih ............................ 70/161 |
| 6,578,935 | B1 | * | 6/2003 | Garretson et al. ......... 312/9.16 |
| 6,603,655 | B1 | * | 8/2003 | Hrehor, Jr. et al. ......... 361/683 |
| 6,633,347 | B1 | * | 10/2003 | Kitazawa .................... 348/837 |

FOREIGN PATENT DOCUMENTS

| JP | 10-119661 | 5/1998 |
| JP | 11-105631 | 4/1999 |
| JP | 11-227538 | 8/1999 |
| JP | 2000-122562 | 4/2000 |

* cited by examiner

*Primary Examiner*—Peter M. Cuomo
*Assistant Examiner*—Erika Garrett
(74) *Attorney, Agent, or Firm*—Sughrue Mion, PLLC

(57) ABSTRACT

A multi-function electronic appliance (1) includes an appliance body (2), an operation display unit (3), rollers (14) and spring pieces (20). The appliance body (2) is provided with a plurality of upright walls (10c). In the upright wall (10c), a guide groove (16) is formed. A through-hole (17) is opened in the guide groove (16). The operation display unit (3) is moves between the position where it covers the front face of the appliance body (2) and the position where it partially opens at least a part of the front face. The roller (14) is provided so as to be rotatable at the upper end of the operation display unit (3) and engaged with the guide groove (16). The spring piece (20) includes an attaching segment (21) attached to the appliance body (21) and an elastic deforming segment (22). The elastic deforming segment (22) advances into the guide groove (16) through the through-hole (17) and urges the roller (14) toward the front face when the operation display unit (3) covers the front face. In such a configuration, a user can obtain good tactile feel when it is operated.

14 Claims, 7 Drawing Sheets

ELECTRONIC APPLIANCE

BACKGROUND OF THE INVENTION

1. Field of the Invention

This invention relates to an electronic appliance having an operation panel provided with a display unit and various kinds of operation buttons, which is mounted in a motor vehicle that is a moving body.

2. Description of the Related Art

The instrument panel of a motor vehicle is equipped with a "car stereo" that is an electronic equipment. The car stereo includes an appliance body attached to the instrument panel and an operation panel equipped with a display unit such as a liquid crystal (LC) display and various operating buttons.

The appliance body incorporates a CD player, MD (Mini disc) player, a CD-ROM player serving as a navigation device, etc. The operation panel serves to display on the LC display the map information in the navigation device and the reproducing status of the CD player and MD player. The operation panel is equipped with touching switches or push buttons used when the operation command for various functions of the navigation device, CD player and MD player is executed.

In order to limit the installing space, the above car stereo has an inserting inlet where the above CD, MD or CD-ROM can freely taken in or out from the side (referred to the front face) facing a user of the appliance body. The operation panel of the car stereo is made slide-movable over the distance from the position where it covers the front face to the position where it opens at least a part of the front face. Therefore, the operation panel is attached to the appliance body so as to have a slight gap on its portion.

In the above car stereo, with the operation panel located at the position where it opens at least a portion of the front face, the CD, MD or CD-ROM is taken out from and in the appliance body. After the CD, MD or CD-ROM has been inserted in the appliance body, the operation panel is moved to the position where it covers the front face. Then, the touch switch or various push buttons are operated to drive the CD player, MD player or CD-ROM player. Thus, the information representative of the reproducing status of these players is displayed on the LC display.

In the above conventional car stereo, the operation panel is slide-movable between the position where it covers the front face and the position where it opens a part of the front face. In order to prevent the operation panel from vibrating owing to the vibration of the motor vehicle to generate foreign sound, an elastic body such as a cushion is attached to the front face of the appliance body. In this case, when the operation panel is located at the position where it covers the front side, the elastic body is pushed toward the rear side of the operation panel so that it is compressed. Owing to the restitution of the elastic body, the operation panel is urged toward the user.

When the user pushes the touch switch or push buttons against the urging force of the elastic body, the operation panel will move slightly. Therefore, the operation panel moves in the same direction as the pushing direction. Accordingly, good tactile feel cannot be given to the user.

SUMMARY OF THE INVENTION

An object of this invention is to provide an electronic appliance provided with an operation panel which can give good tactile feel when it is operated.

In order to attain the above object, in accordance with this invention, there is provided an electric appliance comprising:

an appliance body;

an operation panel which is slidably attached to a face of the appliance body and can slide-movable between a position where it covers the face and another position where it opens at least a portion of the face; and an urging unit attached to the appliance body for urging the operation panel, wherein when the operation panel is situated at the position where it covers the face, the urging unit urges the operation panel toward the face of the appliance body.

In a preferred embodiment, the operation panel is provided with a rotatable roller, the appliance body has a sliding groove with which the roller is slidably engaged, the operation panel slides relatively to the face while the roller rolls along the sliding groove, and when the operation panel is situated at the position where it covers the face, the roller is urged by the urging unit.

In a preferred embodiment of this invention, the urging unit-is a spring piece composed of an attaching segment attached to the appliance body and an elastic deforming segment which is located with the sliding groove and elastically deformed in contact with the roller.

In a preferred embodiment of the invention, the elastic deforming segment is situated within the groove at a position opposite to the face through the the roller when the operation panel is at the position where it covers the face.

In accordance with the configuration described above, the urging unit urges the operation panel located at the position where it covers the one face of the appliance body toward the one face of the appliance body. Namely, the operation panel is urged in substantially the same direction as the operation button provided on the operation panel is operated. Thus, the operation panel will not be moved. This provides a user to good tactile feel.

In accordance with the configuration described above, since the urging unit is provided within the rolling path of the roller which permits the operation panel to be slide-movable, the operation panel is urged when it is only located at the position where it covers the face of the appliance body. Therefore, the urging unit does not require any specific means for urging the operation panel, but can urge the operation panel by a simple configuration.

In accordance with the configuration described above, the attaching segment of the spring piece which is the urging unit is secured to the appliance body and the elastic deforming member integral thereto is located in the rolling path of the roller. Therefore, even when the roller of the operation panel is brought into contact with the elastic deforming segment to push and elastically deforms it, the restoring force against the pushing force by the roller can be surely given to the roller so that the operation panel can be surely urged.

In accordance with the configuration, the elastic deforming segment of the spring piece which is the urging means is situated within the groove at a position opposite to the face through the roller when the operation panel is at the position where it covers the face. Therefore, when the operation panel is at the position where it covers the face of the appliance body so that the roller is brought into contact with the elastic deforming segment to push it, the restoring force by the elastic deforming segment can be given to the face of the appliance body.

The above and other objects and features of this invention will be more apparent from the following description taken in conjunction with the accompanying drawings.

DESCRIPTION OF THE PREFERRED EMBODIMENT

Figure 1:
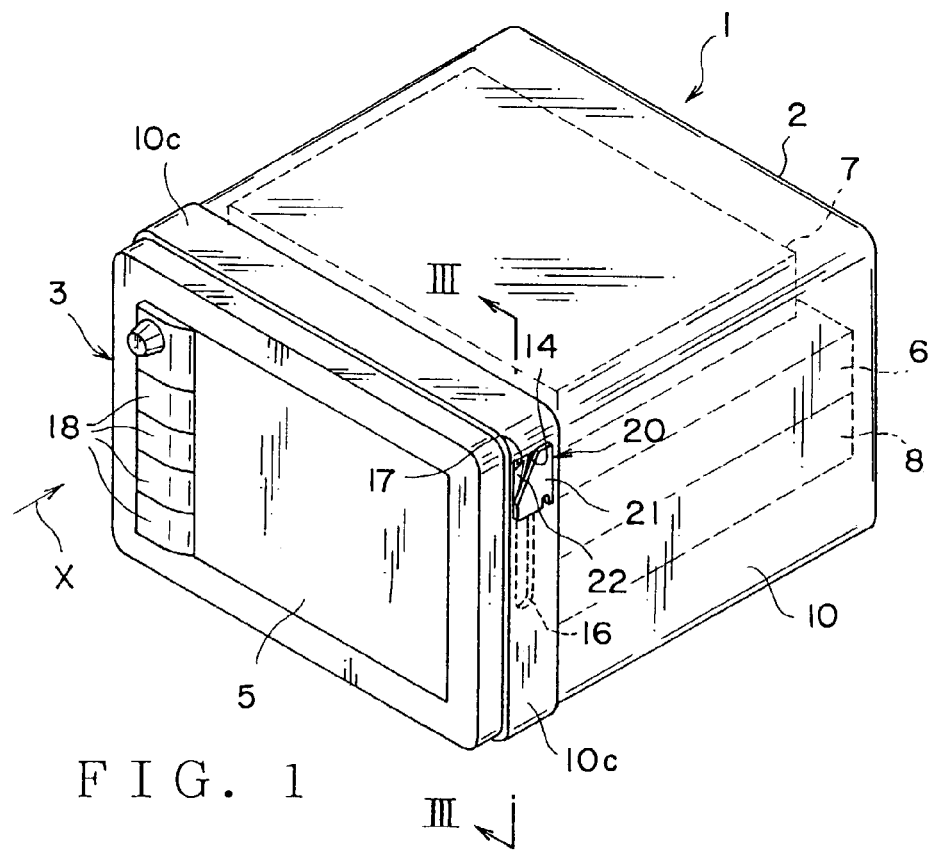
FIG. 1 is a perspective view of a multi-function electronic appliance according to an embodiment of this invention.

Now referring to the drawings, an explanation will be given of a multi-function electronic appliance 1 according to an embodiment of this invention. The electronic appliance 1 shown in FIG. 1 is mounted on the instrument panel of a motor vehicle that is a moving body. As seen from FIGS. 1 and 2, the electronic appliance 1 includes an appliance body 2 and an operation display unit 3 that serves as an operation panel. The operation display unit 3 is provided with rollers 14 which protrude at upper positions on both sides. The rollers 14 are to be urged by spring pieces 2 fixed to the appliance body 2.

Figure 2:
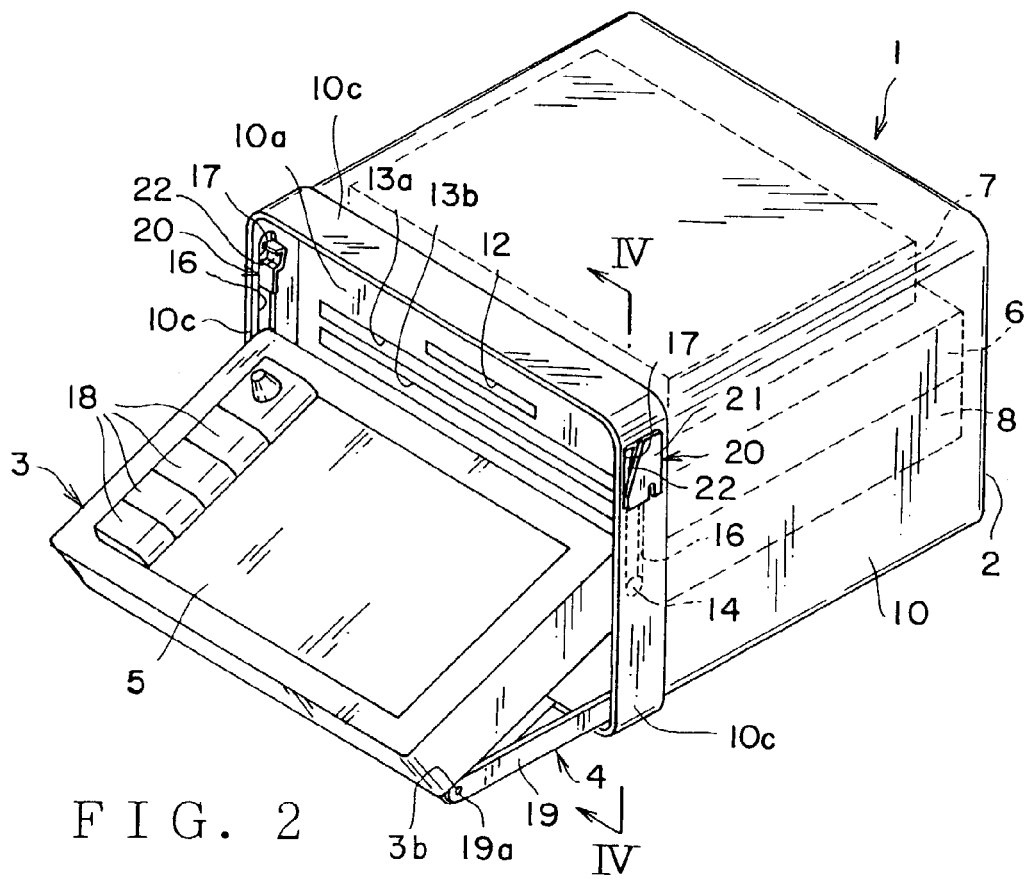
FIG. 2 is a perspective view of the multi-function electronic appliance when its front side is partially opened by an operation display unit.
Figure 3:
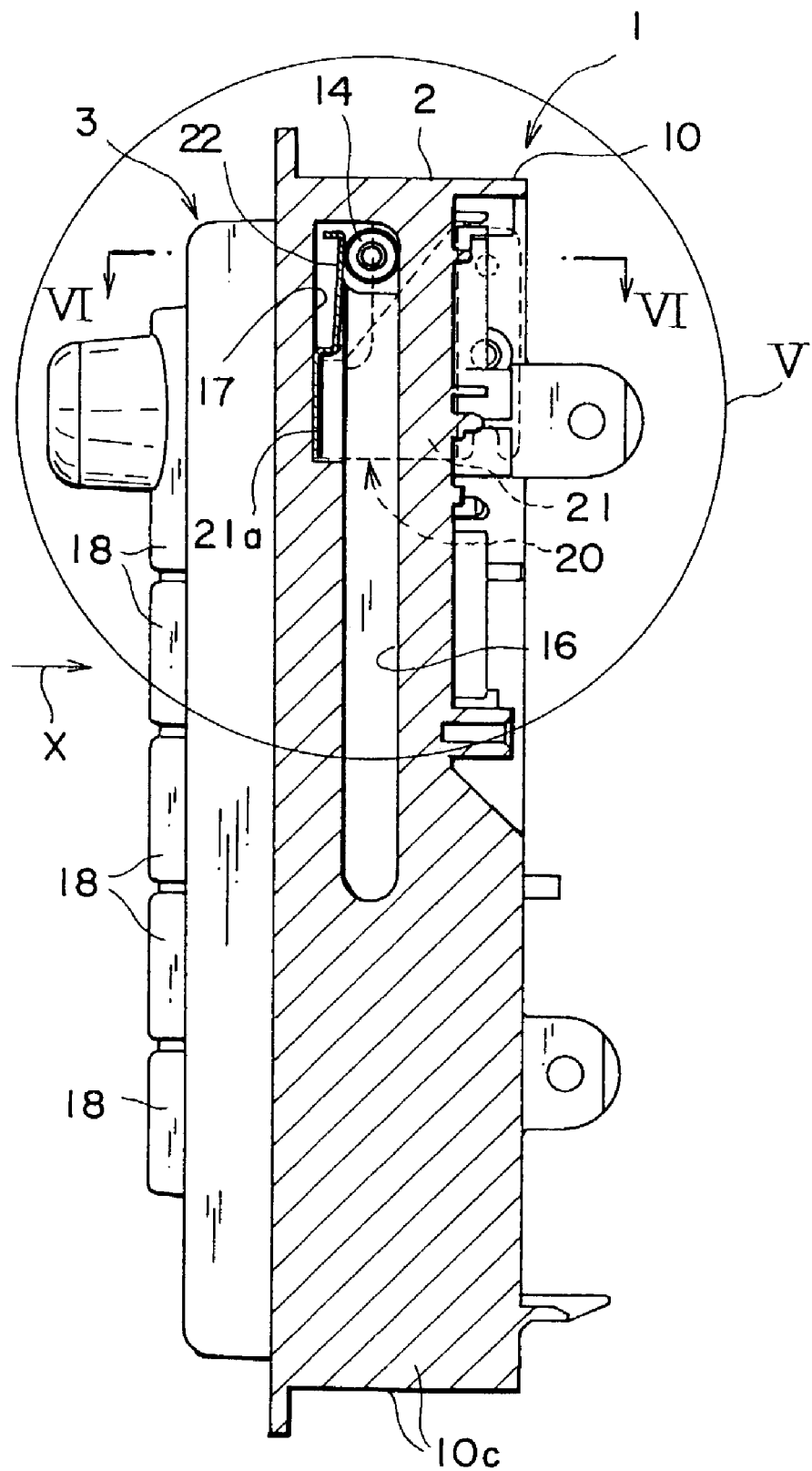
FIG. 3 is a sectional view taken in line III—III in FIG. 1.

The appliance body 2 includes a chassis 10 formed like a box, a front face 10a located at the front end of the chassis 10 and on this side in FIG. 3, a reproduction device such as a CD player 6 (not shown) accommodated within the chassis 10 and a driving mechanism 4 (which is partially shown in FIG. 2) which serves to slide the operation display unit 3 for the front face 10a. At the front face 10a, upright walls 10c are integrally formed so as to be upright from four sides of the chassis 10. The operation display unit 3 is rotatably accommodated in the space formed by the plurality of upright walls 10c.

Guide grooves (sliding grooves) 16 which extend vertically are formed in the upright walls 10c located on both sides of the operation display unit 3 accommodated in the space. The guide grooves 16 are formed in a concave shape from the inner faces of the upright walls 10c. The rollers 14 are to be slidably engaged with these guide grooves 16 as described later. As seen from FIGS. 3 to 8, in the vicinity of the upper portion of the guide groove 16 in the upright wall 1c, a through-hole 17 is formed. The through-hole 17 penetrates from the above space to the outside of the chassis 10.

In an illustrated embodiment, the chassis 10 incorporates a CD player 6 and an MD player 7, which serve as reproducing devices and a CD-ROM player 8 serving as a navigation device. Although not shown, the chassis 10 may incorporate an AM/FM tuner for receiving radio broadcasting and a television tuner for receiving a television broadcasting. These reproducing devices and receiving device can operate when a user pushes one of push buttons 18 attached to the operation display unit 3.

As seen from FIG. 2, the front face 10a has a slit 12 for inserting an MD into the MD player 7, and slits 13a and 13b for inserting a CD and CD-ROM into the CD player 6 and CD-ROM player 8.

Figure 4:
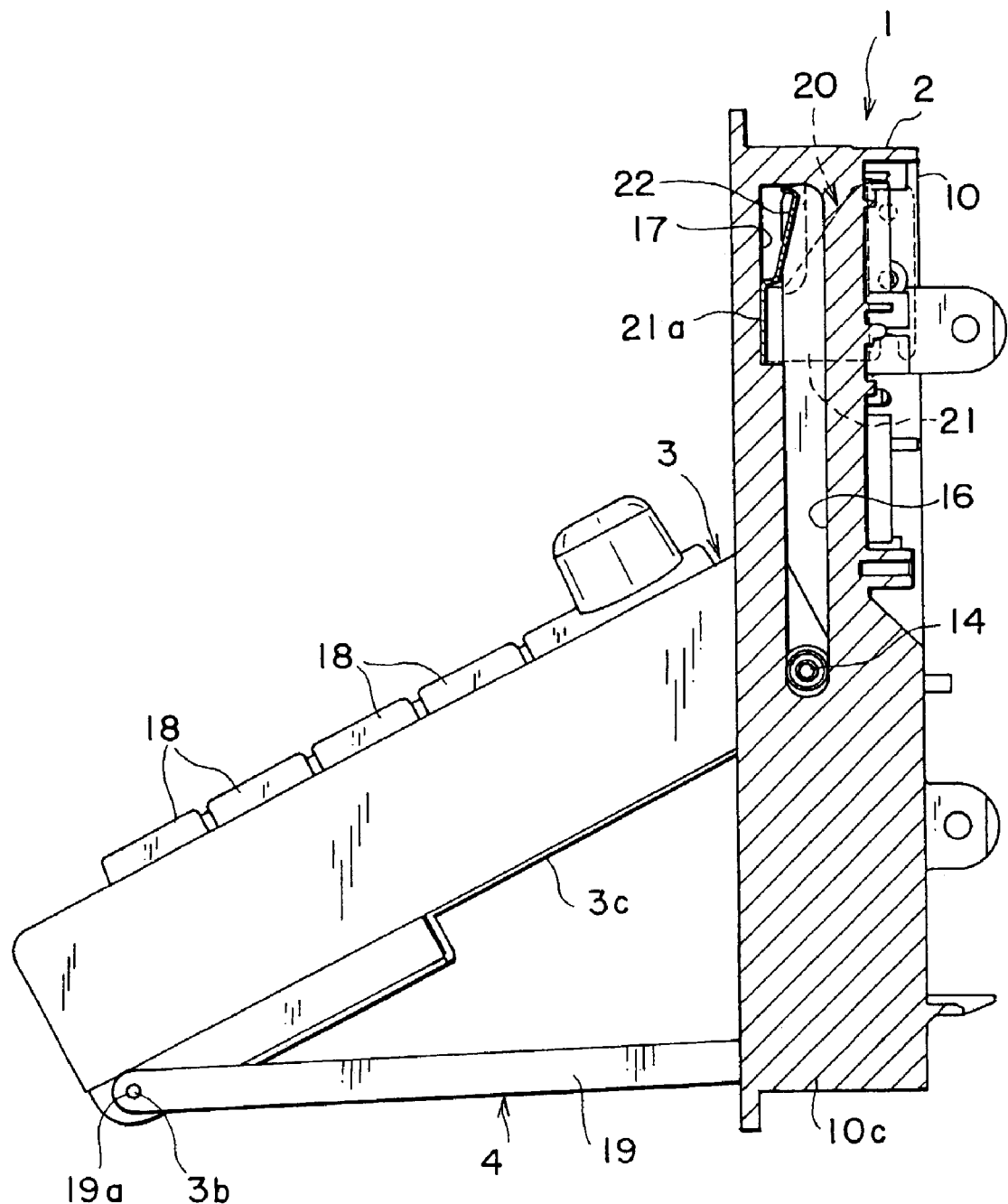
FIG. 4 is a sectional view taken in line IV—IV in FIG. 2.

The driving mechanism 4 includes a pair of arms 19 and a motor (not shown). These arms extend unidirectionally in a belt-shape. The arms 19 are slidably supported by the chassis 10 in the longitudinal direction. The arms 19 can move along the inner surfaces of both side walls of the chassis 10. Each arm 19 has a hole 19a formed at its end (FIG. 4). A pair of pins 3b (FIG. 4) which are attached to lower portions on both sides of the operation display unit 3. Each pin 3b is rotatably fit in the hole 19a. The motor causes each arm to slide relative to the chassis 10. Specifically, owing to the driving force of a motor, each arm 19 is moved from and into the chassis 10 through a through-hole (not shown) formed at the lower end of the front face 10a.

As each arm 19 is moved from and into the chassis 10, the above roller 14 slides along the guide groove 16. Specifically, owing to the driving force from the motor, each arm 19 moves outwardly from the chassis 10 so that the operation display unit 3 is brought down with its surface oriented upward. Thus, the operation display unit 3 is shifted to the position where at least a portion of the front face 10a of the chassis is opened (FIG. 2). Further, when each arm 19 is moved into the chassis 10, the operation display unit 3 in the brought state is shifted to the position where it covers the front face 10a of the chassis 10 (FIG. 1). The roller 14 is positioned at the upper end of the guide groove 16.

The operation display unit 3 is provided with a display panel 5 such as a liquid crystal display (LCD) for displaying image information. The operation display unit 3 displays on the display panel the map information reproduced from the CD-ROM player 8 and the image of the television broadcasting received by the television tuner.

The operation display unit 3 is provided with a plurality of push buttons 18 on the surface. These push buttons 18 are operated in such a manner that they are pushed by the user in the direction of arrow X. When these push buttons are pushed, the various reproducing devices accommodated in the chassis 10 are operated and the operation display unit 3 is slid. For example, when the select button (e.g. button for selecting the CD, MD etc.) or an OPEN button of the push buttons 18, the operation display unit 3 is slide-moved by the driving mechanism 4. Specifically, when the MD is selected by the select button, by the driving mechanism, the operation display unit 3 is slid to the position where only the slit 12 formed in the front face 10a of the chassis 10 is opened. When the OPEN button is pushed, the operation display unit 3 is slide-moved to the position where all the slots (slit 12 and inserting openings 13a and 13b) are opened. When the desired disk such as the CD, MD, etc. has been inserted into or ejected from the slot 12, 13a or 13b, the operation display unit 3 is automatically shifted to the position where it covers the front face 10a of the chassis 10 (it covers all the slots 12, 13a and 13b). Incidentally, with the front face 10a of the chassis 10 opened, when the desired disk has been inserted, the operation display unit 3 is shifted to the position where it covers the front face 10a. Then, when the reproducing button (play) button or search button of the push buttons 18 is pushed by the user, the reproduction or search of the disk is performed. The sliding movement is executed in such a manner that the microcomputer (not shown) controls the rotating direction or rotary speed. The microcomputer recognizes that the push button 18 has been pushed by the user or the disk has been inserted by the user, and controls the rotary direction and speed of the motor so that the operation display unit 3 is slid to the position corresponding to the operation.

The rollers 14 are provided so as to be rotatable around shafts at upper ends of both sides of the operation display unit 3. The rollers 14 are engaged with the guide grooves 16 to rotate around the shafts so that they can move along the guide grooves 16. Each roller 14 is engaged with the guide groove 16 with a slight gap therefrom so that it can smoothly slide along the guide groove. The rollers 14 are projected from the sides of the operation display unit 3.

Figure 7:
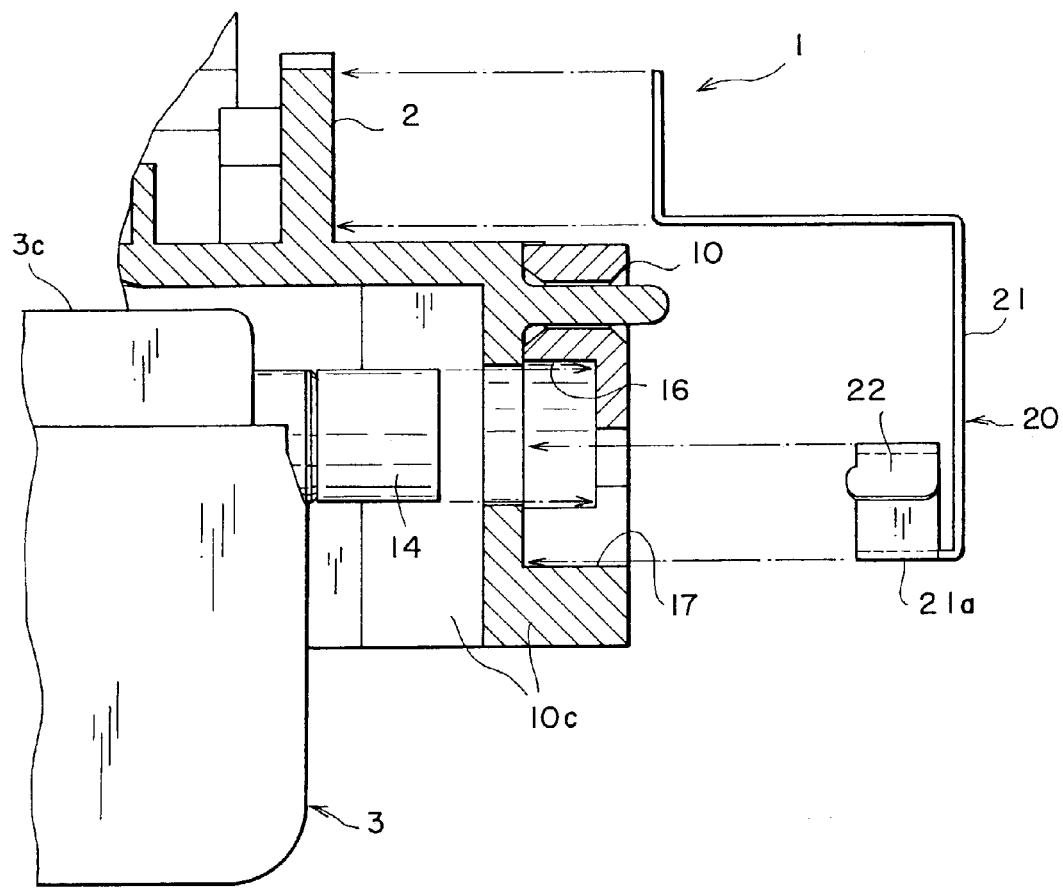
FIG. 7 is a sectional view of an exploded sectional view of the main part of the multi-function electronic appliance shown in FIG. 6.
Figure 8:
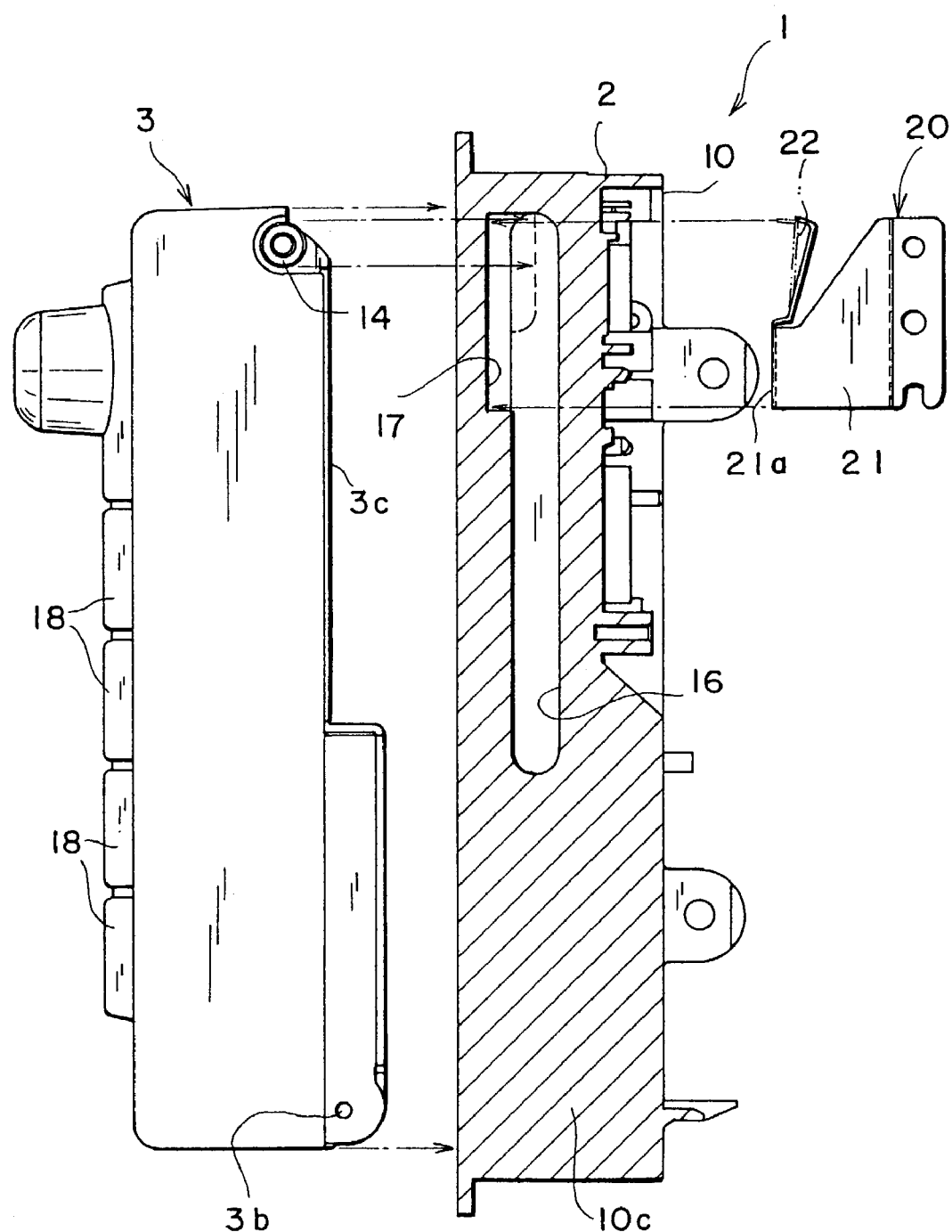
FIG. 8 is an exploded side sectional view of the multi-function electronic appliance shown in FIG. 1.

A spring piece 20 is formed of a metal sheet, and as seen from FIGS. 7 and 8, it is integrally composed of an attaching segment 21 and an elastic deforming segment 22. The attaching segment 21 is formed of a sheet along the outer face of the upright wall 10*c*. The attaching segment is attached to the appliance body 2 by a screw in such a manner that it is superposed on the outer face of the upright wall 10*c*.

Figure 5:
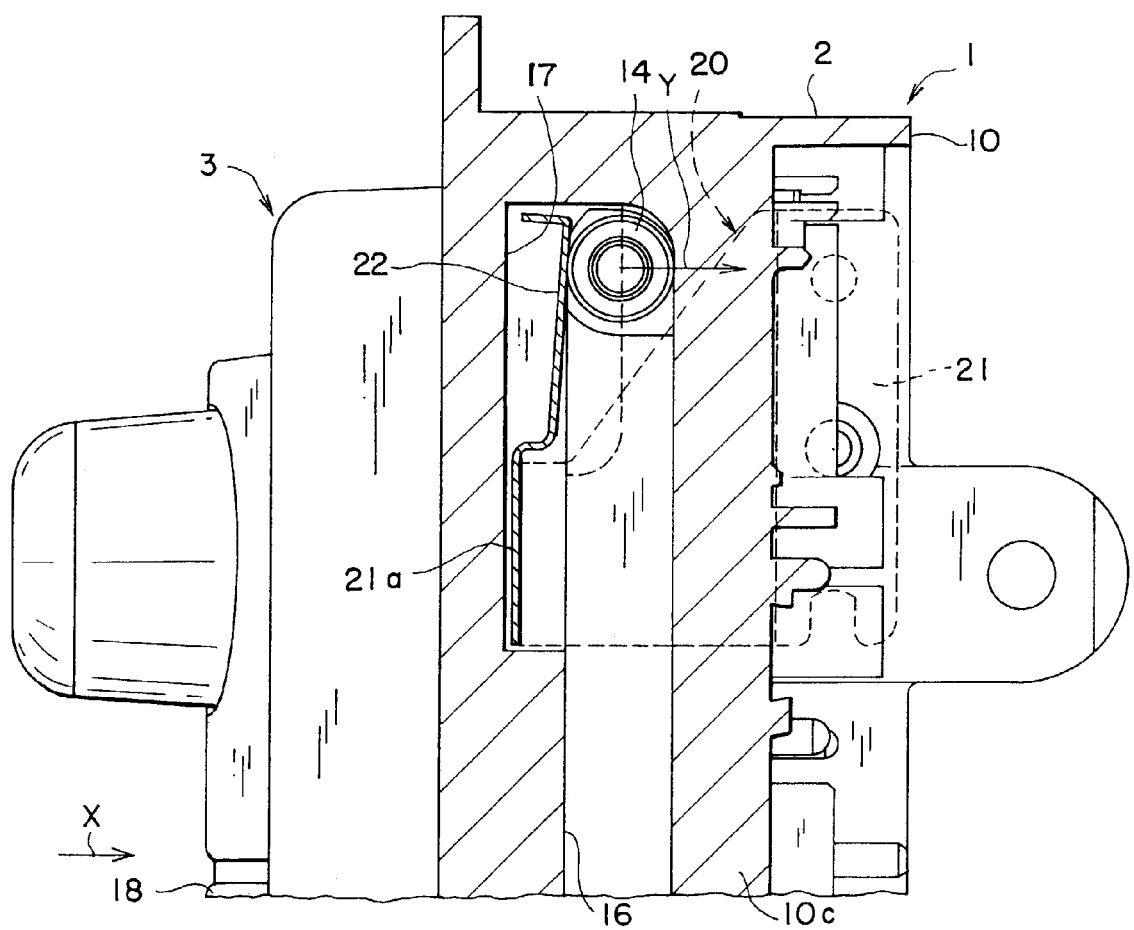
FIG. 5 is an enlarged sectional view of area V in FIG. 3.
Figure 6:
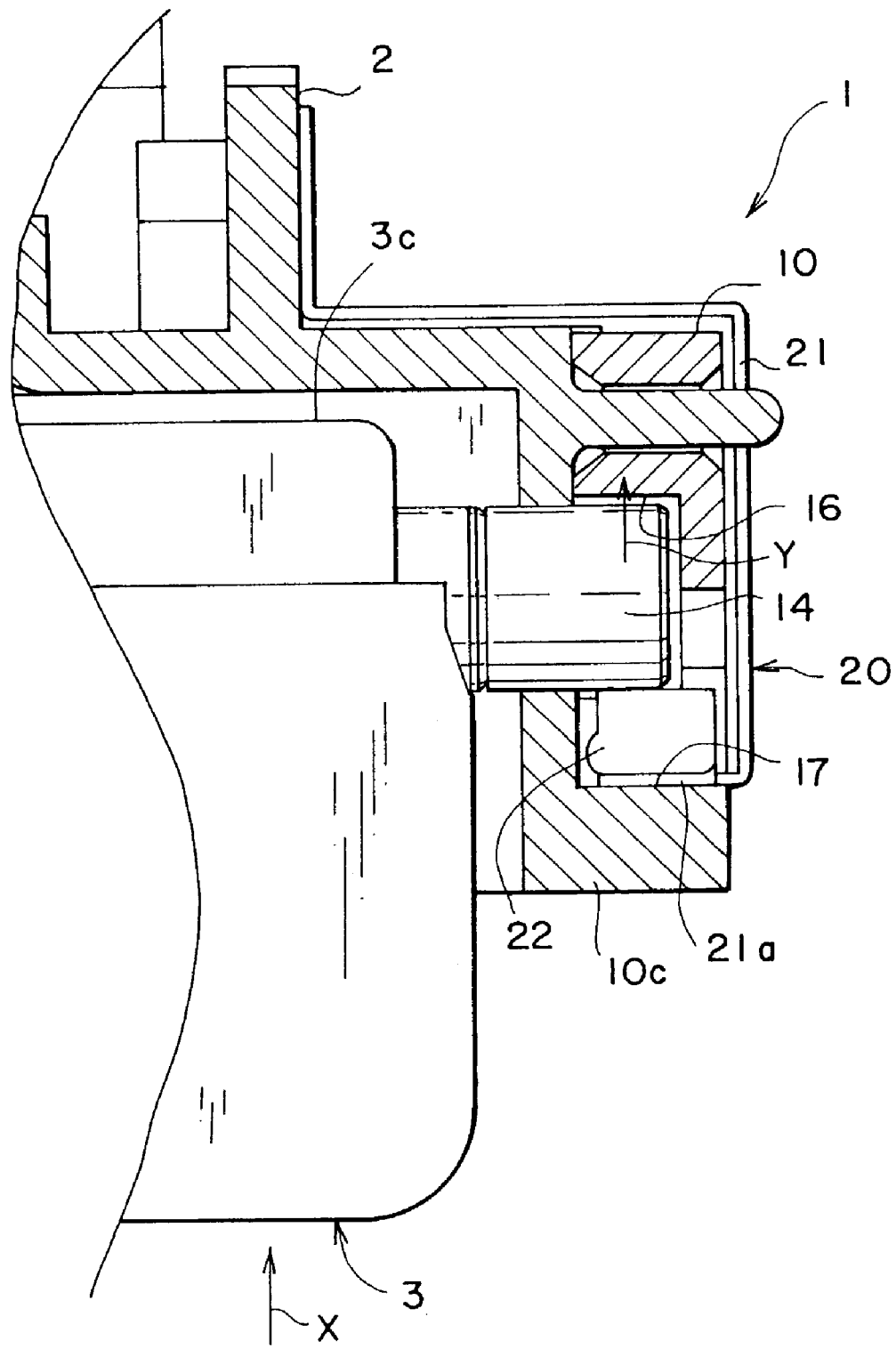
FIG. 6 is a sectional view taken in line VI—VI in FIG. 3.

The elastic deforming segment 22 is formed in a belt shape. When the attaching segment 21 is attached to the upright wall 10*c*, the elastic deforming segment 22 is slightly inclined from its one end of the attaching segment 21 upward toward the front face 10*a* from a bended segment 21*a* which is bent toward the space formed by the plurality of upright walls 10*c*. When the attaching segment 21 is attached to the outer face of the upright wall 10*c*, as seen from FIG. 4, the bent segment 21*a* and the elastic deforming segment 22 invade the inside of the upright wall 10*c* through the through-hole 17. Further, the elastic deforming segment 22 is positioned within the guide groove 16. When the operation display unit 3 is moved to the position where it covers the front face 10*a*, the elastic deforming segment 22 is pushed so that it is elastically deformed as shown in FIGS. 3 and 5. The elastic deforming segment 22 is deformed from the state where it is not pushed by the roller 14 as indicated in solid line in FIG. 8 to the state where it is pushed by roller 14 as indicated in two-dot chain line.

When the attaching segment 21 is attached to the outer surface of the upright wall 10*c*, the elastic deforming segment 22 is located at the upper end of the guide groove 16. Specifically, when the operation display unit 3 is moved to the position where it covers the front face 10*a*, the roller 14 is located at the upper end of the guide groove 16. Therefore, by locating the elastic-deforming segment 22 at the upper end, the elastic deforming segment 22, which is pushed by the roller 14 with its movement is elastically deformed in the state as shown in FIG. 3 or FIG. 4. Further, when the operation display unit 3 is located at the position where it covers the front face 10*a*, i.e. the roller 14 is brought into contact with the elastic deforming segment 22, the elastic deforming segment 22 is located within the guide groove 16 so that it is opposite to the front face 10*a* with respect to the roller 14.

In this way, when the operation display unit 3 is located at the position where it covers the front face 10*a*, the roller 14 pushes the elastic deforming segment 22 so as to be elastically deformed, and the elastic deforming segment 22 urges the operation display unit 3 in the direction of arrow Y in FIG. 5 by its restoring force. Namely, by the urging force of the elastic deforming segment 22, the roller 14 is pushed on the side wall near to the front face 10*a* of the guide groove 16 so that the operation display unit 3 itself is secured to the appliance body 2. Incidentally, the urging direction of the elastic deforming segment 22 is substantially the same as the direction (the direction indicated by arrow X in FIGS. 1 and 5) of the pushing force applied when the push button 18 is operated. Therefore, when the user pushes the bushing button 18, the operation display unit 3 is not moved. For this reason, the user is given good tactile feel.

When the contact state between the roller 14 and the elastic deforming segment 22 is released (the operation display unit 3 is moved to the position where it opens at least a portion of the front face 10*a*), the elastic deforming portion 22 is returned to the initial position and held in its position while the roller 14 is not in contact with the elastic deforming position. In this embodiment, although an explanation was given of the manner of urging the roller 14 projected from the one side of the operation display unit 3, this also applies to the urging of the roller from the other side.

In the multi-function electronic appliance 1 having the configuration described hitherto, when the MD, CD, or CD-ROM is inserted into the appliance body 2, the operation display unit 3 is located at the position as shown in FIGS. 2 and 4. In this case, the elastic deforming portion 22 of the spring 20 is held in the state where it is not in contact with the roller 14 and not elastically deformed.

Where the MD, CD or CD-ROM is reproduced, or the map information or the image of television broadcasting is displayed on the display panel 5, the operation display unit 3 is moved to the position shown in FIGS. 1 and 3. When the operation display unit 3 is at the position where it covers the front face 10*a*, the elastic deforming portion 22 is elastically deformed in contact with the roller 14 and urges the roller 14 toward the front face 10*a* in the direction of arrow Y. Namely, the elastic deforming segment 22 urges the roller 14 in the direction of the rear face 3*c* of the operation display unit 3 being oriented to the inner side of the appliance body 2.

In accordance with this embodiment, when the operation display unit 3 covers the front face 10*a*, the elastic deforming segment 22 is located on the opposite side to the front face 10*a* with respect to the roller 14. Namely, the elastic deforming segment 22 is located on the side of the roller 14 far from the appliance body 2. Therefore, the elastic deforming segment 22 is located on the side of the roller 14 near to the user.

The elastic deforming segment 22 is elastically deformed in contact with the roller 14 which is rotatably provided at the upper end on each of both sides of the operation display unit 3. Therefore, the elastic deforming segment 22 urges the roller 14 and hence the operation display unit 3 toward the front face 10*a* in the direction of arrow Y. Namely, the elastic deforming segment 22 surely urges the roller 14 in the direction of the rear face 3*c* of the operation display unit 3 being oriented to the inner side of the appliance body 2.

Thus, the elastic deforming segment 22 urges the operation display unit 3 in the same direction as that of operating the push button 18 indicated by arrow X. When the push button 18 is pushed toward the inner side of the appliance body 2, the operation display unit 3 will not be moved. For this reason, the push button 18 can be operated satisfactorily with no sense of incongruity and with good tactile feel.

The attaching segment 21 of the spring piece 20 is secured to the appliance body 2, and the elastic deforming segment 2 is located within the guide groove 16 which is a sliding path of the roller 14. Therefore, when the operation display unit 3 is only situated at the position where it covers the front face 10*a*, the elastic deforming segment 22 can urge the roller 14 and hence the operation display unit 3. For this reason, any specific mechanism for causing the spring piece 20 to urge the operation display unit 3 is not required, but the operation display unit 3 can be urged by a simple configuration. When the roller 14 is brought into contact the elastic deforming segment 22 so that the former pushes and elastically deforms the latter, the restoring force against the pushing force by the roller 14 can be surely applied to the roller 14. Thus, the operation display unit 3 can be surely urged.

In the above embodiment, a plurality of push buttons 18 are provided on the display panel 5 of the operation display unit 3. However, in this invention, a touch switch or touch panel may be provided on the display panel.

What is claimed is:

1. An electric appliance comprising:
   an appliance body;
   an operation panel which is slidably attached to a face of said appliance body and can move slidingly between a first position where it covers the face and a second position where it opens at least a portion of the face; and
   an urging unit attached to the appliance body for biasing said operation panel;
   wherein
   when said operation panel is situated at the first position where it covers said face, said urging unit biases said operation panel toward the face of said appliance body with a greater amount of biased tension than an amount of biased tension when said operation panel occupies the second position.

2. An electric appliance according to claim 1, wherein said operation panel is provided with a rotatable roller,
   said appliance body has a sliding groove with which said roller is slidably engaged,
   said operation panel moves slidingly relatively to said face while the roller rolls along the sliding groove, and
   when said operation panel is situated at the first position where it covers the face, said roller is biased by said urging unit.

3. An electric appliance according to claim 2, wherein said urging unit is a spring piece composed of an attaching segment attached to said appliance body and an elastic deforming segment which is located within said sliding groove and elastically deformed in contact with said roller.

4. An electric appliance according to claim 3, wherein when said operation panel is at the first position where it covers said face, said elastic deforming segment is situated within said groove at a position opposite to said face with respect to said roller.

5. An electric appliance comprising:
   an appliance body;
   an operation panel comprising a top portion slidably attached to a face of said appliance body, wherein said operation panel is operable to move slidingly between a first position where it completely covers the face of said appliance body and a second position where at least a portion of the face of said appliance body is exposed; and
   a deformation device operable to bias the top portion of said operation panel toward the face of said appliance body when said operation panel is situated in the first position with a greater amount of biased tension than an amount of biased tension when said operation panel occupies said second position.

6. An electric appliance comprising:
   an appliance body;
   an operation panel which is slidably attached to a face of said appliance body and moves between a first position where it covers the face and a second position where it opens at least a portion of the face; and
   a biasing unit attached to the appliance body for biasing said operation panel, in which, when said operation panel is situated at the first position, said biasing unit biases said operation panel with a greater amount of biased tension than an amount of biased tension when said operation panel occupies said second position.

7. An electric appliance, comprising:
   an appliance body;
   an operation panel which is slidably attached to a face of the appliance body and moves slidingly between a first position and a second position,
   wherein said operation panel covers a storage medium receiving unit when the operation panel is in the first position, and
   wherein said operation panel exposes the storage medium receiving unit when the operation panel is in the second position; and
   an elastic member that biases the operation panel towards the face of the appliance body with a greater amount of biased tension when the operation panel is in the first position than when the operation panel is in the second position.

8. An electric appliance according to claim 7, wherein the elastic member is attached to the appliance body.

9. An electric appliance according to claim 7, wherein the elastic member comprises a spring.

10. An electric appliance according to claim 7, wherein the storage medium receiving unit comprises a slit.

11. An electric appliance according to claim 7, wherein the operation panel is provided with a pin,
    wherein the appliance body has a groove, and
    wherein the pin moves within the groove when the operation panel moves between the first position and the second position.

12. An electric appliance according to claim 11, wherein, when the operation panel is in the first position, the elastic member biases the pin.

13. An electric appliance according to claim 12, further comprising an attaching segment attached to the appliance body and the elastic member,
    wherein the elastic member is located within the groove and is elastically deformed when the elastic member biases the pin.

14. An electric appliance according to claim 13, wherein, when the operation panel is in the first position, the elastic member is situated within the groove at a position opposite to the face with respect to the pin.

* * * * *